United States Patent [19]

Hergenrother

[11] 3,852,243

[45] Dec. 3, 1974

[54] POLYPHENYLQUINOXALINES CONTAINING LATENT CROSSLINKING GROUPS

[75] Inventor: Paul M. Hergenrother, Mercer Island, Wash.

[73] Assignee: The Boeing Company, Seattle, Wash.

[22] Filed: July 23, 1973

[21] Appl. No.: 381,913

Related U.S. Application Data

[63] Continuation-in-part of Ser. No. 287,407, Sept. 8, 1972, Pat. No. 3,778,412, which is a continuation-in-part of Ser. No. 139,884, May 3, 1971, abandoned, which is a continuation-in-part of Ser. No. 846,576, July 31, 1969, abandoned.

[30] Foreign Application Priority Data

Aug. 21, 1972  Great Britain.................... 38828/72

[52] U.S. Cl.............. 260/50, 117/161 UN, 161/257, 260/326 N, 260/33.11 P, 260/49, 260/65
[51] Int. Cl............................................................ C08g 33/02
[58] Field of Search.............. 260/47 CZ, 50, 49, 65

[56] References Cited
UNITED STATES PATENTS

| | | | |
|---|---|---|---|
| 2,895,944 | 7/1959 | Mark | 260/65 |
| 3,661,850 | 5/1972 | Stille | 260/50 |

*Primary Examiner*—Lester L. Lee
*Attorney, Agent, or Firm*—Christensen, O'Connor, Garrison & Hovelka

[57] ABSTRACT

Disclosed are polyphenylquinoxalines containing latent crosslinking groups, such as —CN, —OCN, —CNO and —C ≡ CH groups, and processes for preparing and using same. These polymers can be prepared by reacting a bis(o-diamine) and a bis(1,2-dicarbonyl) compound containing latent crosslinking groups in a solvent such as m-cresol, anisole or chloroform. Alternatively, an aromatic bis(o-diamine) can be reacted with a bis (1,2-dicarbonyl) compound containing reactive hydroxyl groups, the resulting hydroxyl-containing polyphenylquinoxalines being then further reacted in a solvent such as N,N-dimethylacetamide with a modifying agent such as cyanogen bromide to provide polyphenylquinoxalines containing —OCN groups. Upon exposure of these polymers to elevated temperatures (optionally in the presence of a catalyst), they undergo crosslinking via the latent crosslinking groups, and become less thermoplastic or essentially non-thermoplastic. The polyphenylquinoxalines of this invention are particularly useful as adhesives, laminating resins, protective coatings, films and membranes for employment in environments requiring high chemical and thermal stability.

36 Claims, No Drawings

POLYPHENYLQUINOXALINES CONTAINING LATENT CROSSLINKING GROUPS

The invention herein described was made in the course of or under a contract with the Department of the Air Force.

CROSS-REFERENCE TO RELATED APPLICATIONS

This application is a continuation-in-part of my application Ser. No. 287,407, filed Sept. 8, 1972 (now U.S. Pat. No. 3,778,412), which is in turn a continuation-in-part of my application Ser. No. 139,884, filed May 3, 1971 (not abandoned), which is in turn a continuation-in-part of my application Ser. No. 846,576, filed July 31, 1969 (now abandoned).

BACKGROUND OF THE INVENTION

This invention relates to polyphenylquinoxalines, processes for preparing and using same and articles produced therefrom.

Polyquinoxalines and polyphenylquinoxalines are known in the art. See for example U.S. Pat. No. 3,661,850; P. M. Hergenrother and H. H. Levine *J. Polymer Sci.* A-1,5, 1453 (1967); P. M. Hergenrother *J. Polymer Sci.* A-1,6, 3170 (1968); P. M. Hergenrother *SAMPE Quarterly* 3(1), 1(1971); P. M. Hergenrother, *J. Macromol. Sci. — Rev. Macromol. Chem.* C6(1), 1(1971); P. M. Hergenrother, Symposium Entitled "Polymeric Materials for Unusual Service Conditions," NASA Ames Research Center (November, 1972); and P. M. Hergenrother *Am. Chem Soc., Reprints of Org. Coatings and Plastics Chem.* 33 (1), 233 (1973). These polymers are useful for making films, fibers, adhesives and laminated articles such as high temperature metal laminates. However, prior art polyphenylquinoxalines are high temperature thermoplastics (i.e., they deform drastically when a load is applied during exposure to high temperatures, e.g., 300°C.). The thermoplastic character of these prior art polymers seriously limits their usefulness in high temperature application. This thermoplasticity can be reduced by curing the polymers at very high temperatures to induce thermal and/or thermal-oxidative degradation of the polymer and concomitant crosslinking. However, because of the polymer degradation, the reduced thermoplasticity is obtained only at the sacrifice of long use life at elevated temperatures.

It is an object of the present invention to provide improved polyphenylquinoxalines overcoming or mitigating the foregoing and other shortcomings of prior art polyquinoxalines and polyphenylquinoxalines. It is another object to provide improved polyphenylquinoxalines that exhibit high glass transition temperatures and low thermoplasticity (or are essentially non-thermoplastic) and also have long use lives at elevated temperatures. Other objects and advantages of the polymers, processes and articles of this invention will become apparent from the following.

SUMMARY OF THE INVENTION

This invention is directed to polymers comprising units of the formula:

I 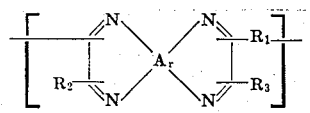

wherein Ar is a tetravalent bis-ortho aromatic group, $R_1$ is a divalent aromatic group and $R_2$ and $R_3$ are each a monovalent aromatic group having a pendent group selected from —CN, —OCN, —CNO and —C≡CH. The preferred polymers of this invention are those consisting essentially of units of Formula I; preferably, the polymers of this invention contain at least five units of Formula I.

By way of example, $R_2$ and $R_3$ can be individually selected from the group consisting of:

II and III 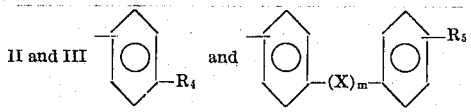

wherein $m$ is 0 or 1, X is —O—, —S—, —CH$_2$— or

and $R_4$ and $R_5$ are —CN or —OCN; $R_4$ and $R_5$ can also be —CNO or —C≡CH. Preferably, $R_2$ and $R_3$ are p-substituted phenylene groups of the formulae:

IV and V 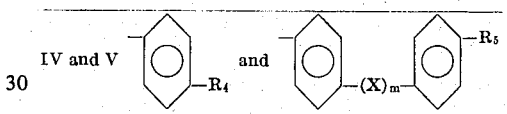

It is preferred that $m$ is 1 and X is —O—, —S— or —CH$_2$—. Most preferably $R_4$ is —OCN, $m$ is 1, X is —O— and $R_5$ is —CN or —OCN.

This invention is also directed to processes for preparing and using the polymers of this invention and to adhesive compositions, films, membranes, coatings and laminates prepared therefrom.

DETAILED DESCRIPTION OF THE INVENTION

Polymer Preparation

The polyphenylquinoxalines of this invention can be prepared by reacting an aromatic bis (o-diamine) of the formulae:

VI 

with a bis(1,2-dicarbonyl) compound of the formula:

VII 

wherein Ar, $R_1$, $R_2$ and $R_3$ have the same meanings ascribed elsewhere herein. Salts of the bis (o-diamines) can also be used. Alternatively, polymers of Formula I containing pendent —OCN groups can be prepared by reacting polymers of the same formula but having —OH groups in place of —OCN groups with cyanogen bromide, thereby to effect conversion of the hydroxyl groups to —OCN groups. Preferably, the polymers of this invention have inherent viscosities of at least 0.3 (more preferably at least 0.5) measured at 25°C. as 0.5% solutions in m-cresol or N,N-dimethylacetamide.

Exemplary of the tetravalent bis-ortho aromatic groups from which Ar can be selected are those of the formulae:

VIII–IX 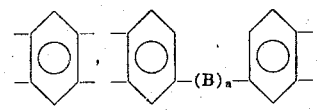

X and XI 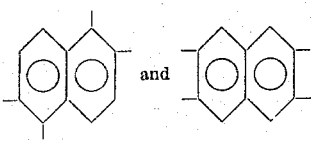

wherein $a$ is 0 or 1 and B is —O—, —S—, —SO—, —SO$_2$—,

—CH$_2$—,

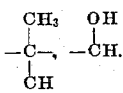

Referring to Formulae VIII – XI, exemplary Ar groups are thus: tetravalent 1,2,4,5-benzene, 3,3',4,4'-biphenyl, 3,3',4,-4'-diphenyl ether, 3,3',4,4'-thiodiphenyl ether, 3,3',4,4'-diphenylsulfoxide, 3,3',4,4'-diphenylsulfone, 3,3',4,4'-benzophenone, 3,3',4,4'-diphenylmethane, 3,3',4,4'-diphenylisopropane, 3,3',4,4'-diphenylmethanol, 1,2,5,6-naphthalene, and 2,3,6,7-naphthalene groups. Preferred Ar groups are those of Formulae VIII and IX wherein $a$ is 0 or 1 and B is —O—, —S—, —SO—, —SO$_2$—,

—CH$_2$—, or

Most preferred Ar groups are those of Formulae IX wherein $a$ is 1 or 1, and B is —O—, —S—,

or —CH$_2$—.

Exemplary of the divalent aromatic groups from which R$_1$ can be selected are those of the formulae:

XII–XIV 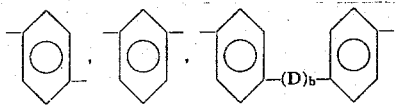

XV–XVI 

XVII and XVIII 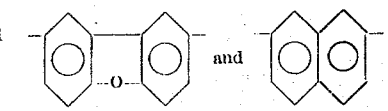

wherein $b$ is 0 or 1 and D is —O—, —S—, —SO$_2$,

—CH$_2$— or

Referring to Formulae XII - XVIII, exemplary R$_1$ groups are thus: p-phenylene, m-phenylene, p,p'-biphenylene, p,p'-oxydiphenylene, p,p'-thiodiphenylene, p,p'-sulfonyldiphenylene, p,p'-carbonyldiphenylene, p,p'-methylenediphenylene, p,p'-isopropylidenediphenylene, a 2-pyridinediyl, a 2-pyrrolediyl, 2,7-dibenzofurandiyl, and 2,6-naphthalene. Preferred R$_1$ groups are those of Formulae XII — XIV wherein $b$ is 0 or 1 and D is —O—, —S—,

or —CH$_2$—. Most preferred R$_1$ groups are those of Formulae XII – XIV wherein $b$ is 1 and D is —O—, —S— or —CH$_2$—.

The particularly preferred polymers of Formula I are those wherein Ar is a 3,3',4,4'-biphenyl or 3,3',4,4'-benzophenone group; R$_1$ is a m-phenylene or p,p'-oxydiphenylene group; and R$_2$ and R$_3$ are individually selected from the group of Formulae IV and V wherein R$_4$ is —OCN, $m$ is 1, X is —O— and R$_5$ is —CN or —OCN.

As indicated by Formula I, the reaction of the bis(o-diamine) and bis-(dicarbonyl) compound can yield a mixture of isomers, i.e., —2,2'—,—2,3'— and —3,-3'—. The predominant isomer can be predicted based on a consideration of the relative reactivity of the carbonyl groups of the bis-(1,2-dicarbonyl) compound.

The polymers of this invention are preferably prepared by reacting the appropriate bis(o-diamine) and bis(1,2-dicarbonyl) compound containing latent crosslinking groups in a solvent selected from m-cresol, anisole, pyridine, chloroform, sym-tetrachloroethane, mixtures of the foregoing and mixtures of xylene or toluene with m-cresol or sym-tetrachloroethane. Solution polymerization is generally conducted by adding the bis(1,2-dicarbonyl) reactant in the form of a solid, slurry or solution to a slurry of the bis(o-diamine). The choice of solvent, rates of addition and mixing, and reaction temperature are important if polymer solutions of the highest quality are to be obtained. The choice of solvent is governed by the structure of the polymer. The choice of addition rate depends upon the form of bis-(1,2-dicarbonyl) compound being used. The addition of a solution should be effected more slowly than the addition of a slurry or solid. If the addition of the solution is effected too rapidly, premature crosslinking and branching in the polymer can result.

Preparation of polymers of this invention is preferably carried out at temperatures of from about 10° to about 75°C., most preferably from about 25°C. to 40°C. The optimum reaction temperature varies with the reactivity and solubility of the reactants. If the temperature is too low, the reaction proceeds at an uneconomically slow rate, while at temperatures too high, premature crosslinking and branching can occur through the carbonyl groups. The hydroxyl-containing polymers referred to previously are preferably prepared and reacted with cyanogen bromide in N,N-dimethylacetamide, dimethylformamide or dimethylsulfoxide in which they are soluble.

As indicated previously, care should be exercised in the selection of the solvent, addition time and reaction temperature used in the preparation of the polymers of this invention. However, even when care is exercised in the selection of these parameters, the resulting polymer solutions will occasionally exhibit various degrees of gelling or become extremely thick and unworkable. The gelling or thickening occurs either immediately after preparation or upon standing, and is particularly likely to occur when the reactants used are very pure and when the molecular weight of the polymers and the solids content of the solution are high. If the reactants used in the polymer preparation are not of high purity, and gelling problem is less serious. However, the use of impure reactants is not an attractive solution to the gelling problem because the oxidative stability and mechanical performance of the final polymer are usually diminished as compared to polymers prepared from high purity reactants. It has been found that the gelling problem referred to can be substantially avoided by upsetting the stoichiometry from about 0.5 to about 2.5 mole % (preferably 0.5 to 1.0%) in favor of one or the other reactants.

Although the oxidative stability of the polyphenylquinoxalines of this invention is very good, it can be even further improved by "capping" the end groups of the polymer chains to provide polymers which contain fewer reactive end groups which would otherwise serve as potential centers to initiate thermal oxidative degradation of the polymer. Thus, when the stoichiometry is upset to provide polymer molecules rich in o-amino end groups, benzil or another compound such as benzoyl chloride, capable of reacting with the o-amino end groups, is used to form a more stable moiety such as a quinoxaline or benzimidazole ring. If the polymer molecules are rich in 1,2-dicarbonyl end groups, then a compound such as o-phenylenediamine capable of forming a stable end group such as a quinoxaline is used. The amount of end-capping compound used can vary from a stoichiometric quantity to a large excess. The excess end-capping reagent can be removed by precipitation of the polymer or by leaching from a film or coating prepared from the polymer solution. End-capping can also be employed to improve the oxidative stability of polymers of this invention prepared from stoichiometric amounts of reactants and the oxidative stability of prior art polyquinoxalines and polyphenylquinoxalines.

Polymers of Formula I can be prepared so as to contain as-triazine and/or quinoxaline moieties as well as phenylquinoxaline moieties. Random-type copolymers containing quinoxaline and phenylquinoxaline moieties can be prepared by reacting a mixture of bis(1,2-dicarbonyl) compounds (e.g., one that contains latent crosslinking groups and one that does not) with one or more bis(o-diamine) or mixture of bis(o-diamine) and diamidrazone. Block-type copolymers can be prepared by combining and reacting an oligomeric phenylquinoxaline solution with an oligomeric quinoxaline solution and/or an oligomeric as-triazine solution. The preparation of random-type and block-type copolymers analogous to those just mentioned is illustrated in my aforementioned application Ser. No. 287,407 (now U.S. Pat. No. 3,778,412), which is incorporated herein by this reference.

Blends of two or more different polymers of this invention (e.g., one containing pendent —CN groups and another containing pendent —CNO groups), blends of polymers of this invention with prior art polymers, and polymers prepared from mixtures of different bis(1,2-dicarbonyl) compounds of Formula VII are also within the scope of this invention.

Heat Treatment

Upon heat treatment (optionally in the presence of a catalyst), the polymers of this invention exhibit increased glass transition temperatures and heat distortion temperatures (and hence, lowered thermoplasticities), or in some instances (particularly in the case of —OCN containing polymers) become essentially non-thermoplastic (i.e., essentially thermoset in character) and have no detectable glass transition temperatures. All evidence indicates that the lowered thermoplasticity is a result of intramolecular and intermolecular crosslinking via the latent crosslinking groups, i.e., —CN, —OCN, —CNO and —C≡CH. (As used herein, the term "latent" is used to denote that the crosslinking groups are essentially inert to the conditions under which the polymers of this invention are prepared.) Crosslinking is thought to occur by one or more of the following mechanisms, depending on the latent crosslinking groups present:

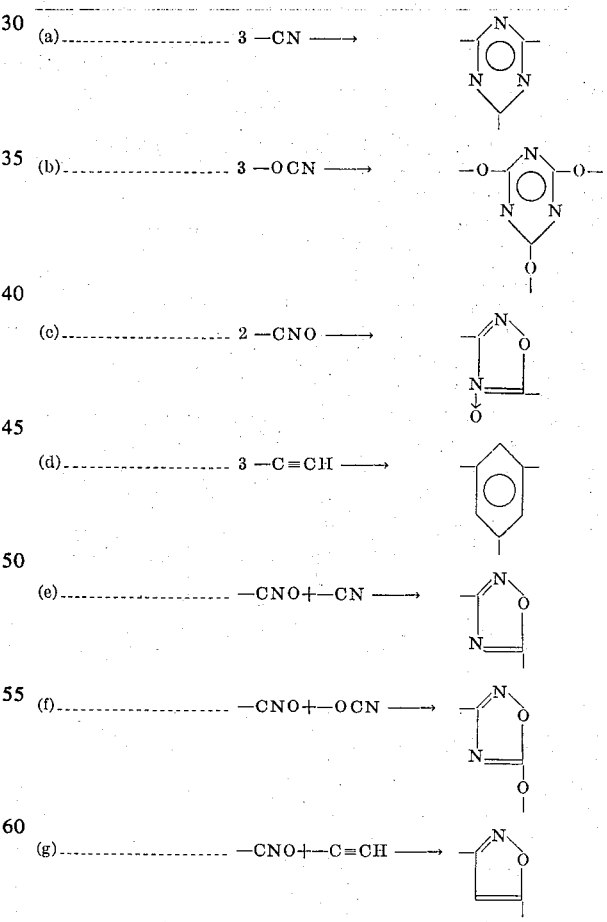

Various materials which can be used as catalysts for the trimerization of the nitriles and cyanate esters to sym-triazines are proton acids such as the hydrogen halides (HF, HCl, HBr and HI), chlorosulfonic acid and p-toluenesulfonic acid; Lewis acids, such as boron trifluoride, aluminum chloride, ferric chloride, zinc oxide and titanium oxide; and basic catalysts such as trialkyl amines, triaryl amines or ammonium hydroxide.

The heat treatment temperatures necessary to effect crosslinking of the polymers of this invention will depend on the particular crosslinking groups present in the polymer(s) being employed, and also depends on the concentration or frequency of occurrence of those groups. The minimum temperature necessary to effect the desired degree of crosslinking can be readily determined by heating samples of a polymer to different temperatures and observing the effect on polymer properties. Crosslinking can be confirmed by the observing reductions of infrared absorptions characteristic of crosslinking group(s) present in the polymer together with increase in or disappearance of the glass transition temperature of the polymer or the polymer's becoming essentially non-thermoplastic.

To induce trimerization of nitrile groups in the absence of a catalyst, temperatures of at least 250°C. will usually be necessary, while trimerization of cyanate ester groups will occur as somewhat lower temperatures, e.g., at least 100°C. Temperatures high enough to cause substantial polymer degradation should be avoided if optimum polymer properties are to be obtained. Thus, heat-treatment of the polymers of this invention (in air or an inert atmosphere) should generally be conducted at temperatures of less than 450°C.

Polymers consisting solely of units of Formula I will, upon crosslinking, usually be completely insoluble in m-cresol and other organic solvents. This will not necessarily be true of the copolymers of this invention that contain other units free of crosslinking groups.

A series of copolymers containing units of Formula I in varying frequencies will exhibit varying degrees of thermoplasticity and different glass transition temperatures after being heat treated. This is advantageous because one can "tailor" or select from such a series a copolymer providing particular thermomechanical properties. Similarly, polymers of this invention can be blended with other polymers, such as polyphenylquinoxalines disclosed in the U.S. patent and publications referred to previously, to provide polymer compositions having the desired properties.

In the following examples all parts and percentages are by weight unless otherwise indicated. Examples 1 through 3 are directed to the preparation of various reactants employed in subsequent Examples. The remaining Examples pertain to the preparation and characterization of polyphenylquinoxalines of this invention and prior art polyphenylquinoxalines.

EXAMPLE 1 p,p'-Oxybis(p''-cyanobenzil)

Following the procedure of Jaeger and Robinson, J. Chem. Soc. 744 (1941), p-aminophenylacetic acid (60g, 0.4 mole) was dissolved in aqueous sodium carbonate (52g, 300 ml) to yield a dark brown solution. A cold solution of sodium nitrite (28g) in water (80 ml) was added and the resulting solution was added during 1.5 hr. to a stirred solution of concentrated hydrochloric acid (168 ml) and water (168 ml) at 0° to 5°C. After complete addition, the resulting orange solution was stirred at 5°C for 0.5 hr and then added during 1.5 hr. to a vigorously stirred solution of copper sulfate pentahydrate (96g) and potassium cyanide (120g) in water (500 ml) at 0° to 5° C. Pronounced foaming was observed during the addition. After stirring for 1 hr. at 5°C, the resulting dark purple reaction mixture was heated to 45° C for 0.5 hr. followed by filtration. The orange filtrate was acidified with dilute hydrochloric acid and filtered to yield a yellow solid (45.3g). Recrystallization from water (1.4 liter) using charcoal yielded p-cyanophenylacetic acid as yellow needles, m.p. 149°–151.5°C. The aqueous portion was extracted with cloroform which was concentrated and the yellow solid recrystallized from water to afford yellow needles (14.3g) m.p. 148°–151°C. Total yield of the nitrile was 40.3g (58% yield). The nitrile (39.8g, 0.23 mole) was stirred in thionyl chloride (250 ml) containing a few drops of N,N-dimethylformamide at ambient temperature for 3 days. The orange solution was concentrated to dryness at less than 60°C under vacuum to yield an orange solid (47.4g, 108% yield) which was dissolved in methylene chloride (200 ml) containing diphenyl ether (20.4g, 0.12 mole). The orange solution was added during 80 min. to a slurry of anhydrous aluminum chloride (41g, 0.31 mole) in dry methylene chloride (100 ml) at 5° to 8°C. The resulting dark red reaction mixture was stirred 18 hr. at ambient temperature, followed by pouring onto ice and hydrochloric acid. The organic phase was separated, washed with water, and concentrated to dryness to yield a brown, low melting solid (44.7g). Extraction with alcohol (700 ml) provided a yellow solid (10.5g) softening at 160°C with melting at 169°–172°C. Recrystallization from a 1:1 mixture of alcohol and benzene (400 ml) provided a light tan solid (7.1g), which softened at 180° C and melted 184°–187°C. This was recrystallized again from benzene (125 ml) and n-hexane (25 ml) to afford a granular cream-colored crystalline material (4.8g), m.p. 186°–188.5°C. The intermediate nitrile-containing diketone (4.1g, 0.009 mole) and selenium dioxide (2.0g, 0.18 mole) were refluxed in glacial acetic acid (55 ml) for 18 hr. A hot filtration provided a yellow filtrate which upon cooling yielded an amorphous yellow solid (2.8g). Recrystallization from ethanol (200 ml) afforded p,p'-oxybis(p''-cyanobenzil) as a yellow solid (2.0g) with unusual melting behavior. Starting at RT, melting began at 189°C with major melting at 194°C and clearing at 201°C. When the yellow solid was introduced into a preheated oil bath at 189°C, an immediate clear yellow melt formed.

Anal. Calc'd. for $C_{30}H_{16}N_2O_5$: %C, 74.37; %H, 3.33; %N, 5.78

Found: %C, 74.28; %H, 3.36; %N, 5.66

EXAMPLE 2

Meta-bis(p'-cyanophenoxyphenylglyoxalyl)benzene

A solution of the diacid chloride of m-phenylenediacetic acid (8.4g, 0.037 mole) in sym-tetrachloroethane (TCE, 100 ml) was added dropwise during 0.5 hr. to a stirred slurry of p-cyanodiphenyl ether (21.0g, 0.11 mole) and anhydrous aluminum chloride (26.6g, 0.20 mole) in TCE (160 ml) at ambient temperature. After the addition, the red reaction mixture was stirred overnight at ambient temperature followed by pouring onto ice and hydrochloric acid. The organic phase was separated, washed twice with water, dried over Drierite (calcium sulfate), and concentrated to approximately 100 ml volume. Hexane was added to the concentrated TCE solution to precipitate a tan solid (17.4g) which was recrystallized from a mixture of alcohol (300 ml) and benzene (100 ml) to afford a light tan amorphous solid (11.9g), m.p. 146.5°–149°C. The light tan intermediate diketone (11.9g, 0.022 mole) and selenium dioxide (4.82g, 0.044 mole) in glacial acetic acid (100 ml) were refluxed for 18 hr. followed by a hot filtration and concentration to about 50 ml volume. Upon the addition of methanol, a tan precipitate (10.1g) formed which melted at 136° to 139°C. and cleared at 149°C. When a sample was introduced into a preheated oil bath at 141°C., an immediate clear pale yellow melt formed. Recrystallization from a mixture of alcohol (100 ml) and benzene (100 ml) afforded a first crop (3.1g) which softened at 137°C., melted at 141°–145°C., and cleared at 150°C. The filtrate was concentrated and diluted with methanol to afford a second crop (6.0g) which was recrystallized from ethanol (350ml) to provide a pale yellow solid (2.9g) which softened at 138°C., melted at 139.5°–141.5°C. and cleared at 149.5°C.

Anal. Calc'd. for $C_{36}H_{20}O_6N_2$: %C, 74.99; %H, 3.49; %N, 4.86

Found: %C, 74.03; %H, 3.43; %N, 4.76

EXAMPLE 3

Meta-bis(p'-hydroxyphenylglyoxalyl)benzene

Meta-phenylenediacetic acid (320g, 1.65 mole) was stirred in thionyl chloride (1 liter) containing a few drops of N,N-dimethylformamide at ambient temperature for 48 hours. The clear orange solution was concentrated at less than 50°C under vacuum to yield a yellowish orange liquid residue which was poured into cold n-hexane with vigorous stirring. A yellow crystalline solid formed which was washed well with n-hexane and dried over phosphorus pentoxide in vacuo to yield the diacid chloride of m-phenylenediacetic acid, mp 40° – 43°C (340g, 89% yield). A solution of the diacid chloride of m-phenylenediacetic acid (69.0g, 0.30 mole) and anisole (138g) in carbon disulfide (250 ml) was added dropwise during 2 hr. to a stirred slurry of anhydrous aluminum chloride (98g, 0.74 mole) in carbon disulfide at 8° to 12°C. After complete addition, the dark red reaction mixture was stirred at ambient temperature for 18 hr. followed by slowly pouring onto ice and hydrochloric acid with stirring. Methylene chloride (about 200 ml) was used to rinse out the reaction flask which was also poured onto the ice. The organic phase was separated, washed twice with cold water, dried over Drierite, and concentrated in a water bath. The residual tan solid was washed in a Waring blender twice with n-hexane and dried to yield the intermediate diketone in 92% yield (102g), m.p. 82°–84°C. Meta-bis(p'-methoxyphenacyl)benzene (103g, 0.277 mole) and selenium dioxide (61.5g, 0.554 mole) were refluxed in glacial acetic acid (1 liter) for 6 hr. The black reaction mixture was filtered hot and the red filtrate treated with charcoal and Celite (filter aid) and refiltered. Upon cooling, a yellow solid (70.4g, 72% yield) m.p. 112°–114.5°C separated; this solid was recrystallized from ethanol (1.5 liter) to afford m-bis(p'-methoxyphenylglyoxalyl)benzene as yellow fluffy crystals (38.5g, 55% yield), m.p. 116.5°–117.5°C. Meta-bis(p'-methoxyphenylglyoxalyl)benzene (47.8g, 0.12 mole) was dissolved in glacial acetic acid (500 ml) and aqueous hydrobromic acid (47–48%, 150 ml) was added. The reaction mixture was refluxed for 22 hr. followed by pouring the cooled light red solution into ice water (1 liter). The resulting yellow precipitate was removed, washed with water, and dissolved in aqueous potassium hydroxide solution (50g in 1 liter $H_2O$). Filtration provided a clear red solution which was neutralized with hydrochloric acid to provide an orange gum. Upon washing in boiling water, the orange gum turned yellow and solidified to yield a yellow solid (40.8g) which sintered at 184°C, wet at 190°C, and cleared at 200°C. The yellow solid was boiled in water (1.4 liter) and ethanol was added (about 300 ml) until a clear solution formed. Filtration provided a yellow solution which was partially cooled (to about 45°–50°C) and refiltered. Upon cooling, a yellow amorphous solid formed which was again recrystallized from the water-ethanol (5:1) mixture. Meta-bis(p'-hydroxyphenylglyoxalyl)benzene was obtained as a yellow solid (11g, 25% yield from the demethylation step), m.p. 204°–205°C.

Anal. Calc'd. for $C_{22}H_{14}O_6$: %C, 70.58; %H, 3.77

Found: %C, 70.47; %H, 3.71

EXAMPLE 4

Polymers 1 and 3 in Table 1 were prepared by the following procedure. The tetracarbonyl compound as a fine powder was added during about 5 min. to a slurry of the tetraamine in a mixture of m-cresol and xylene (1:1) at a concentration of 20% solids. The temperature of the reaction mixture was initially controlled at less than 35°C by means of cooling in a water bath. The reaction mixture was stirred at ambient temperature for about 18 hr. to provide a viscous solution. A small portion of the solution was slowly poured into methanol in a Waring blender to precipitate a fibrous yellow solid which was then boiled twice in methanol. The yellow polymer was dried at about 130°C in vacuo for 4 hr. and characterized as shown in Table 1.

EXAMPLE 5

Polymer 2 in Table 1 was prepared by the following procedure. Metabis(p'-cyanophenoxyphenylglyoxalyl)benzene (1.452g, 0.00252 mole) as a fine powder was added quickly to a stirred slurry of 3,3',4,4'-tetraaminobenzophenone (0.589g, 0.00252 mole) in m-cresol (15 ml) at ambient temperature. After stirring for 1 hr. at ambient temperature, a clear orange solution formed and the solution viscosity increased after stirring an additional 18 hr. at ambient temperature. A portion of the solution was poured slowly into methanol in a Waring blender to precipitate a fibrous yellow solid which was boiled in methanol and dried at about 130°C in vacuo for 4 hr. The resulting polymer exhibited an inherent viscosity (0.5% m-cresol solution at 25°C) of 0.51 dl/g and the following elemental analysis.

Anal. Calc'd. for $(C_{49}H_{26}O_3N_6)_n$: %C, 78.81; %H, 3.51; %N, 11.26

Found: %C, 78.76; %H, 3.62; %N, 11.11

The infrared spectrum was consistent with the proposed structure which showed an absorption at 4.5μ characteristic of a nitrile group. Upon heating a sample to 400°C in nitrogen and maintaining at 400°C for 10 min., the infrared spectrum showed a drastic decrease in the intensity of the nitrile absorption, indicating that the nitrile group underwent reaction to provide crosslinking, presumably through the formation of sym-triazine units.

EXAMPLE 6

Polymer 4 of Table 1 was prepared by the following procedure. To a stirred slurry of 3,3'-diaminobenzidine (0.6642g, 0.0031 mole) in m-cresol (10 ml), p,p'-oxybis(p''-cyanobenzil) (1.4929g, 0.0031 mole) as a powder was added using m-cresol (6 ml) to rinse the residual powder into the flask. A viscous orange solution formed upon stirring at ambient temperature for 0.5 hr. Stirring was continued for 4 hr. and a portion of the solution was quenched in methanol while the remaining solution was used to cast a clear yellow film. The precipitated polymer and film were dried at about 70°C. in air for 18 hr. followed by drying at about 130°C. in vacuo for 4 hr. The precipitated polymer was characterized as shown in Table I.

The inherent viscosities of polymers 1-4 and the glass transition temperature (Tg) of each, before and after cycling at 400°C., are shown in Table I. After cycling to 400°C., polymers 1 and 3 remained soluble in m-cresol, while polymers 2 and 4 swelled but were completely insoluble.

Adhesive bonds were fabricated using polymers 1 and 2. The same adherend, (Titanium 6Al-4V), surface preparation (phosphate-fluoride), carrier (112E glass with an A1100 finish, about 9 mil thick and containing about 0.2% volatiles), and similar cure conditions were used to fabricate tensile shear specimens. As shown in Table 2, polymer 2 exhibited superior strength when tested at 600°F.

TABLE 2

| Polymer Number (see Table 1) | Cure Conditions | Average Tensile Shear Strength (psi) | |
|---|---|---|---|
| | | Room Temp. | 600°F After 10 Minutes |
| 1 (Example 4) | Room temperature to 750°F, 1 hour at 750°F under 50 psi in $N_2$ | 4000 | 400 (410)* |
| 2 (Example 5) | Room temperature to 600°F, 1 hour at 600°F, then 1 hour at 700°F under 50 psi in $N_2$ | 3500 | 1500 (2100)* |

*Postcured 1 hour at 700°F in Air.

The following thermomechanical measurements were performed on polymers 3 and 4: dynamic mechanical relaxation measurement (DMRM) on films using the Vibron viscoelastometer, tensile strain behavior of films, and thermal penetration of moldings. The latter two methods used a Dupont Thermomechanical Analyzer. By DMRM, polymer 4 showed a maximum dispersion peak at 340°C., whereas polymer 3 exhibited one at 293°C. More importantly, the change in the tensile modulus for polymer 4 was significantly less than that for polymer 3; at 250°C., polymer 4 modulus change was about half of that for polymer 3. In the tensile strain behavior measurement, polymer 4 exhibited a pronounced change (i.e., elongation) in the slope at 338°C., whereas polymer 3 showed pronounced elongation at 291°C. By thermal penetration, the slope of the polymer 4 curve began to change at 275°C. with the major change occurring at 327°C., whereas, the slope of the polymer 3 curve began to change at 220°C. with the major change occurring at 285°C. These three methods serve to demonstrate that cyano groups substituted on the PPQ significantly reduce the deformation of the polymer at elevated temperatures. This is also reflected in the performance of adhesive and laminate specimens fabricated from polyphenylquinoxalines containing nitrile groups.

TABLE I

Polymer structure:

$$\left[ \begin{array}{c} N \diagup\diagdown N \\ \diagdown Ar \diagup \\ X \diagup N \quad N \diagdown X \end{array} \right] -Y-$$

| Polymer number | Ar | Y | X | $\eta_{inh}$, (dl./g.)* | Tg, °C.** Initial | Tg, °C.** After cycling to 400°C. in $N_2$ |
|---|---|---|---|---|---|---|
| 1 (Example 4) | phenyl–C(=O)–phenyl | phenyl | phenyl–O–phenyl | 0.72 | 215 | 218 |
| 2 (Example 5) | Same as above | Same as above | phenyl–O–phenyl–CN | 0.51 | 227 | 327 |
| 3 (Example 4) | phenyl–phenyl | phenyl–O–phenyl | phenyl | 1.19 | 290 | 294 |
| 4 (Example 6) | Same as above | Same as above | phenyl–CN | 1.62 | 340 | 371 |

*Inherent viscosity as 0.5% m-cresol solution at 25°C.
**Glass transition temperature, determined by differential scanning calorimetry, $\Delta T = 20°$ C./min. in $N_2$.

By thermogravimetric analysis in both air and nitrogen, polymers 3 and 4 showed no major differences. The infrared spectrum of polymer 4 was consistent with that expected for the proposed structure. After exposing a smaple for 0.5 hr. to 400°C. in nitrogen, the intensity of the nitrile absorption at 4.5μ decreased relative to other absorptions present, presumably due to the formation of sym-triazine moieties.

EXAMPLE 7

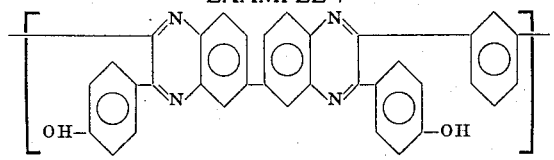

a. To a stirred slurry of 3,3'-diaminobenzidine (2.143g, 0.010 mole) in m-cresol (53ml), m-bis(p'-hydroxyphenylglyoxalyl)-benzene (3.743g, 0.010 mole) was added. The reaction mixture was stirred for 18 hr. at less than 30°C to form a viscous orange solution (viscosity at 25°C = 6,500 cps). A portion of the solution was precipitated in methanol, washed thoroughly in methanol, and dried for 18 hr. at about 150°C in vacuo. The resulting yellow-orange fibrous polymer exhibited an inherent viscosity (0.5% N,N-dimethylacetamide solution at 25°C) of 1.1 dl/g and a Tg (by DSC at ΔT = 20°C/min, $N_2$) of 375°C.

b. To a solution of the polymer of Example 7(a) (1.00g) in N,N-dimethylacetamide (50 ml, dried over molecular sieves), cyanogen bromide (0.7g) was added. Triethylamine (about 0.5ml) was added (to catalyze the reaction —OH→OCN—) and the solution was stirred for 18 hr. at ambient temperature. The solution was poured into water and the resulting precipitated polymer was washed thoroughly in methanol and dried at 40°C over phosphorous pentoxide in vacuo. The infrared spectrum of the resulting polymer showed absorptions characteristic of —OCN at 4.3 to 4.45μ which decreased in intensity after heating a portion to 400°C in nitrogen. The precipitated polymer exhibited no detectable Tg by DSC which suggested crosslinking through the formation of sym-triazine units; the polymer was thermoset in character and was completely insoluble in m-cresol.

Using appropriate starting materials, the general procedure of Example 1 can be employed to prepare bis(1,2-dicarbonyl compounds such as those of Formula VII wherein $R_1$ is p,p'-thiodiphenylene, p,p'-methylenediphenylene, p,p'-isopropylidenephenylene, 2,7-dibenzofurandiyl or 2,6-naphthalene and $R_2$ and $R_3$ are groups of Formula IV. To obtain p,p'-carbonylbis(p,''-cyanobenzil), p,p'-methylenebis(p''-cyanobenzil) can be oxidized with selenium dioxide under pressure following a known procedure [P. M. Hergenrother and D. E. Kiyohara J. Macromol. Sci. — Chem. A5(2), 365 (1971)]. The general procedure of Example 2 can be employed to prepare bis(1,2-dicarbonyl) compounds such as those of Formula VII wherein $R_1$ is selected from those of Formulae XII - XVI where b is 0 or 1 and D is —$SO_2$— and $R_2$ and $R_3$ are selected from groups of Formulae IV and V wherein m is 1, X is —O—, —S— or —$CH_2$— and $R_4$ and $R_5$ are —CN.

Meta-bis(p'-hydroxyphenylglyoxalyl)benzene (see Example 3) can be reacted with cyanogen bromide in N,N-dimethylacetamide using triethylamine as catalyst to yield m-bis(p'-cyanatophenylglyoxalyl)benzene which can then be reacted with a bis(o-diamine). Employing the general procedure of Example 3 and the just-described additional procedure, one can prepare bis(1,2-dicarbonyl) compounds such as those of Formula VII wherein $R_1$ is selected from those of Formulae XII - XVI wherein b is 0 or 1 and D is —$SO_2$—, $R_2$ and $R_3$ are selected from those of Formulae IV and V wherein m is 1, X is —O—, —S— or —$CH_2$— and $R_4$ and $R_5$ are —OCN.

What is claimed is:

1. Polymers comprising units of the formula

wherein Ar is a tetravalent aromatic group, $R_1$ is a divalent aromatic group and $R_2$ and $R_3$ are individually selected from the group

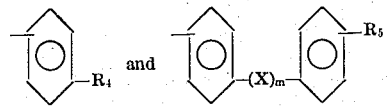

wherein m is 0 or 1, X is —O—, —S—, —$CH_2$— or

and $R_4$ and $R_5$ are —CN or —OCN.

2. Polymers of claim 1 wherein $R_2$ and $R_3$ are individually selected from the group consisting of

3. Polymers of claim 2 wherein m is 1; and X is —O—, —S— or —$CH_2$—.

4. Polymers of claim 2 wherein $R_4$ is —OCN; m is 1; X is —O— and $R_5$ is —CN or —OCN.

5. Polymers of claim 1 wherein Ar is a tetravalent 1,2,-4,5-benzene, 3,3'4,4'-biphenyl, 3,3'4,4'-diphenyl ether, 3,3'4,-4'-thiodiphenyl ether, 3,3',4,4'-diphenylsulfoxide, 3,3',4,4'-diphenylsulfone, 3,3'4,4'-benzophenone, 3,3'4,4'-diphenylmethane, 3,3',4,4'-diphenylisopropane, 3,3'4,4'-diphenylmethanol, 1,2,5,6-naphthalene, or 2,3,6,7-naphthalene group; and $R_1$ is p-phenylene, m-phenylene, p,p'-biphenylene, p,p'-oxydiphenylene, p,p'-thiodiphenylene, p,p'-sulfonyldiphenylene, p,p'-carbonyldiphenylene, p,p'-methylenediphenylene, p,p'-isopropylidenediphenylene, a 2-pyridinediyl, a 2-pyrrole diyl, 2,7-dibenzofurandiyl or 2,6-naphthalene.

6. Polymers of claim 5 wherein $R_2$ and $R_3$ are individually selected from the group consisting of

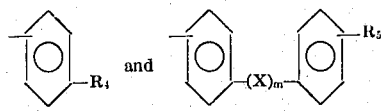

7. Polymers of claim 6 wherein m is 1; and X is —O—, —S— or —$CH_2$—.

8. Polymers of claim 6 wherein R is —OCN; m is 1; X is —O— and $R_5$ is —CN or —OCN.

9. Polymers of claim 1 wherein Ar is a tetravalent 1,2,-4,5-benzene, 3,3',4,4'-biphenyl, 3,3',4,4'-diphenyl ether, 3,3',4,4'-thiodiphenyl ether, 3,3',4,4'-diphenylsulfoxide, 3,3',4,4'-diphenylsulfone, 3,3',4,4'-benzophenone, 3,3',4,4'-diphenylmethane, or 3,3',-4,4'-diphenylmethanol group; and $R_1$ is p-phenylene, m-phenylene, p,p'-biphenylene, p,p'-oxydiphenylene, p,p'-thiodiphenylene, p,p'-carbonyldiphenylene, or p,p'-methylenediphenylene.

10. Polymers of claim 9 wherein $R_2$ and $R_3$ are individually selected from the group consisting of

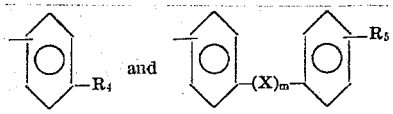

11. Polymers of claim 10 wherein m is 1; and X is —O—, —S— or —$CH_2$—.

12. Polymers of claim 10 wherein $R_4$ is —OCN; m is 1; X is —O— and $R_5$ is —CN or —OCN.

13. Polymers of claim 1 wherein Ar is a tetravalent 3,3',4,4'biphenyl, 3,3',4,4'-diphenyl ether, 3,3',4,4'-thiodiphenyl ether, 3,3',4,4'benzophenone or 3,3',4,4'-diphenylmethane group; and $R_1$ is p-phenylene, m-phenylene, p,p'-oxydiphenylene, p,p'-thiodiphenylene or p,p'-methylenediphenylene.

14. Polymers of claim 11 wherein $R_2$ and $R_3$ are individually selected from the group consisting of

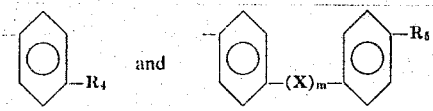

15. Polymers of claim 14 wherein m is 1; and X is —O—, —S— or —$CH_2$—.

16. Polymers of claim 14 wherein $R_4$ is —OCN; m is 1; X is —O— and $R_5$ is —CN or —OCN.

17. Polymers of claim 1 wherein Ar is a 3,3',4,4'-biphenyl or 3,3',4,4'-benzophenone group; and $R_1$ is a m-phenylene or p,p'-oxydiphenylene group.

18. Polymers of claim 17 wherein $R_2$ and $R_3$ are individually selected from the group consisting of

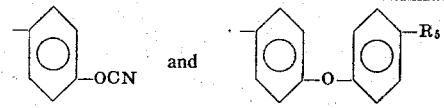

wherein $R_5$ is —CN or —OCN.

19. Polymers comprising units of the formula

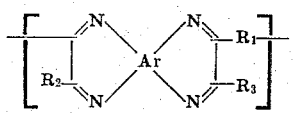

wherein Ar is a tetravalent aromatic group; $R_1$ is a divalent aromatic group; and $R_2$ and $R_3$ are each a monovalent aromatic group having a —CN, —OCN —CNO, or —C≡CH thereon.

20. Polymers consisting essentially of units of the formula of claim 19.

21. Polymers consisting essentially of units of the formula of claim 1.

22. Polymers consisting essentially of units of the formula of claim 2.

23. A process for preparing polyphenylquinoxalines comprising reacting an aromatic tetramine compound containing two sets of ortho-amine functions attached to an aromatic nucleus with a diglyoxal type compound of the formula

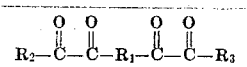

wherein $R_1$ is a divalent aromatic group and $R_2$ and $R_3$ are each a monovalent aromatic group having a —CN or —OCN group thereon.

24. The product produced by exposing a polymer of claim 19 to elevated temperatures whereat said polymer undergoes crosslinking via said —CN, —OCN —CNO, or —C ≡ CH groups.

25. A process comprising reacting a polyphenylquinoxaline with at least one compound selected from benzil, benzoyl chloride, and o-phenylenediamine whereby there are formed quinoxaline or benzimidazole rings on said polyphenylquinoxaline.

26. Polymers of claim 1 comprising at least five of said units.

27. Polymers of claim 2 comprising at least five of said units.

28. Polymers of claim 19 comprising at least five of said units.

29. Polymers of claim 1 consisting essentially of at least five of said units.

30. Polymers of claim 2 consisting essentially of at least five of said units.

31. Polymers of claim 19 consisting essentially of at least five of said units.

32. Polymers of claim 19 wherein $R_2$ and $R_3$ are each a monovalent aromatic group having a —CN or —OCN group thereon.

33. Polymers consisting essentially of units of the formula of claim 32.

34. Polymers of claim 32 comprising at least five of said units.

35. Polymers of claim 32 consisting essentially of at least five of said units.

36. The product produced by exposing polymers of claim 1 to elevated temperatures whereat said polymers undergo crosslinking via $R_4$ and $R_5$.

* * * * *

UNITED STATES PATENT OFFICE
CERTIFICATE OF CORRECTION

Patent No. 3,852,243      Dated    December 3, 1974

Inventor(s)    Paul M. Hergenrother

It is certified that error appears in the above-identified patent and that said Letters Patent are hereby corrected as shown below:

Column 14, line 47, "1,2,-4,5-" should read -- 1,2,4,5- --; line 48, "3,3',4,-4'-" should read -- 3,3',4,4'- --; line 59, "pyrrole diyl" should read -- pyrrolediyl --. Column 15, line 4, "1,2,-4,5-" should read -- 1,2,4,5- --. Column 16, line 3, after "—OCN" insert -- , --; line 25, after "—OCN" insert -- , --. Column 14, claims 2, 6 and 10, the formulae should appear as follows:

Signed and sealed this 18th day of February 1975.

(SEAL)
Attest:

RUTH C. MASON
Attesting Officer

C. MARSHALL DANN
Commissioner of Patents
and Trademarks